Sept. 4, 1928.
G. W. ALDEEN
1,683,320
SPOTLIGHT SWITCH
Filed Feb. 20, 1925
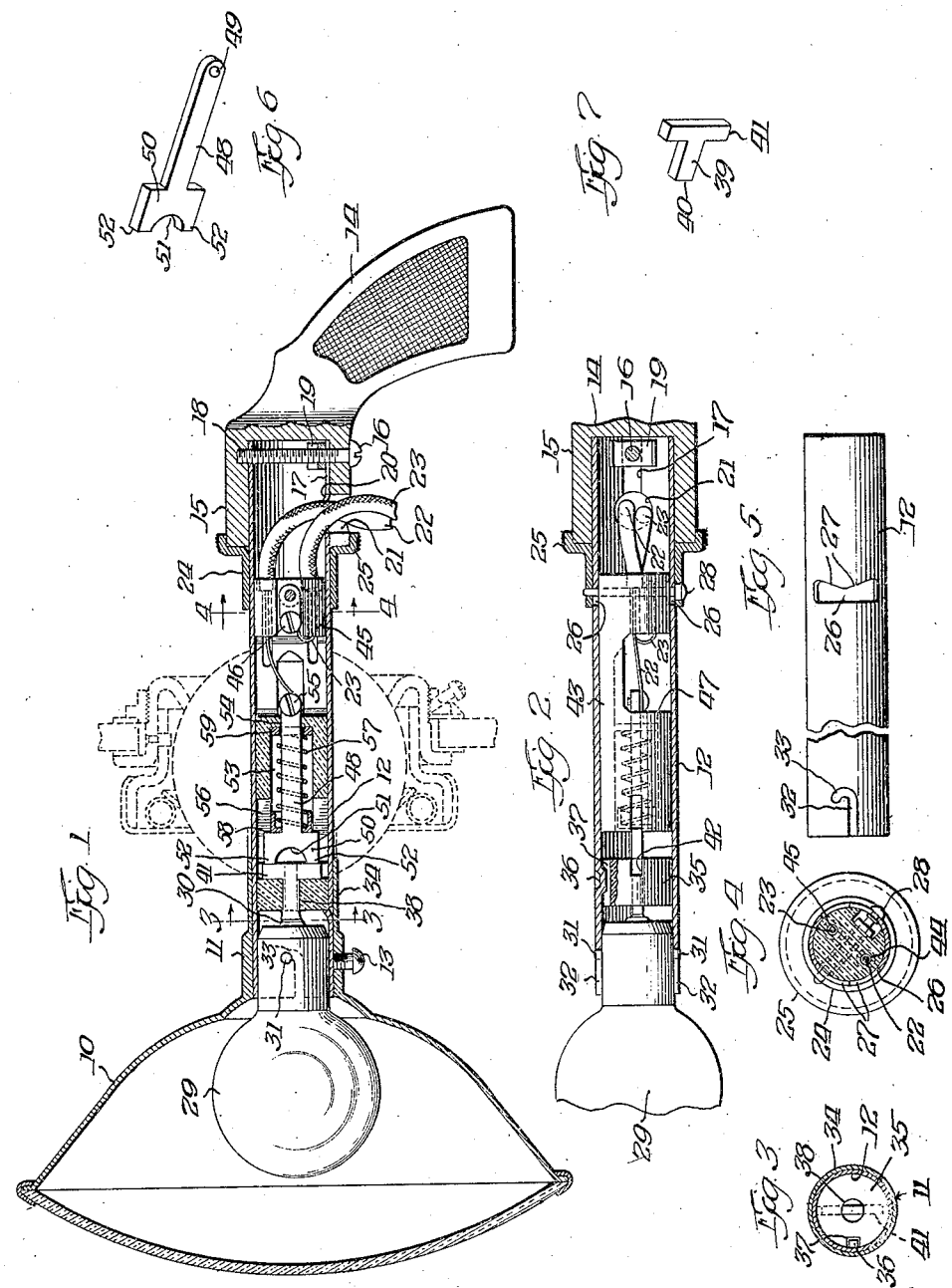

Patented Sept. 4, 1928.

1,683,320

UNITED STATES PATENT OFFICE.

GEDOR W. ALDEEN, OF ROCKFORD, ILLINOIS, ASSIGNOR TO FYRAC MANUFACTURING CO., OF ROCKFORD, ILLINOIS, A CORPORATION OF ILLINOIS.

SPOT-LIGHT SWITCH.

Application filed February 20, 1925. Serial No. 10,500.

This invention relates to spotlights of the type having an universal mounting in a supporting member such as a windshield of an automobile, and the primary object thereof is to provide a novel and simple switch unit adapted to be contained in the tube constituting a part of the mounting for the spotlight, and which is usually carried by the ball and socket member or other mounting installed in a windshield or other suitable support.

My invention further comprehends the provision of a novel switch or contact means adapted for use with a single contact light bulb, thereby simplifying the structure of the contact mechanism and switch structure, over the double contact type previously employed.

My invention also aims to provide a construction which will be economical to manufacture and will be of light and simple structure not likely to be rendered inoperative or get out of working order, due to displacement or jarring loose of the parts.

The invention also embodies a novel switch structure and means for actuating the same to light or extinguish the spotlight, which can be easily manipulated while grasping the handle of the device and which will be positively maintained in an operative or inoperative position when once actuated, thereby insuring against accidently making or breaking of the circuit, which would result in turning the spotlight on or off.

Another object of the invention is comprehended in the provision of novel means for holding the contacts in engagement and at the same time holding the light bulb in position against accidental displacement.

While I have shown and will hereinafter describe my invention in connection with a spotlight and particularly one of the dirigible type adapted to be mounted upon the glass windshield of an automobile or the like, it is understood that it is not restricted in its use to a spotlight but is capable of use in many structures. Furthermore many variations in the structure, arrangement and application of the parts may be made as desired within the comprehension of my invention which is limited only by the scope of the claims.

Other objects and attendant advantages will be appreciated by those skilled in this art as the invention becomes better understood by reference to the following description when considered in connection with the accompanying drawing, in which—

Fig. 1 is a vertical longitudinal sectional view through a spotlight embodying my invention;

Fig. 2 is a fragmentary view taken at right angles to Fig. 1 with certain of the parts shown in elevation;

Figs. 3 and 4 are cross sectional views taken on the planes of the section lines 3—3 and 4—4 of Fig. 1;

Fig. 5 is a fragmentary elevation showing a slot in the mounting tube of the device;

Fig. 6 is a detailed perspective view of a movable contact member employed in connection with the device; and Fig. 7 is a perspective view of a relatively stationary or sliding contact forming part of the structure or device.

Referring to the drawings in detail, in which similar characters of reference designate corresponding parts throughout the several views of the drawings, 10 designates the spotlight generally, same preferably including the usual reflector casing and lens having a tubular extension sleeve or neck 11 of reduced size at the back adapted to be fixed over the forward end of a tube 12 and retained in fixed position as by means of a set screw 13 engaged through the neck and with the periphery of the tube or otherwise as desired. The tube is adapted to be mounted in a suitable support or bearing of the dirigible or ball and socket type, or otherwise, if desired for example as shown and described in my copending application Serial No. 692,975, filed February 15, 1924. As illustrated in dotted lines in Fig. 1 of the drawings, the tube is shown mounted to support the spotlight for universal angular movement in a ball and socket bearing secured in an opening provided in a glass windshield of an automobile, but it is to be understood that I do not desire to be restricted to this particular use or mounting, as the device is capable of application to other uses without departing from the spirit and scope of the invention.

A handle 14 is mounted on the rear or inner end of the tube 12, and is preferably in the form of a pistol grip having a handle barrel 15 at its forward end fitted over the tube, in which position it is held by a screw 16 which passes through the barrel 15 from below and also through a slot 17 longitudinally in the adjacent portion of the tube 12, the end of the screw entering a hole in the opposite wall of the tube and threading or being secured in a socket 18 in the barrel in alignment therewith. A nut 19 preferably of arcuate form, is threaded on the screw 16 and upon turning the screw into securing position, the nut will be drawn downwardly for clamping the tube and barrel together between the nut and the head of the screw, thus fixedly securing the handle to the tube. The barrel 15 as seen in Fig. 1 is provided with an opening 21 in alignment with a slot or opening 20 in the tube for the purpose of accommodating conduit wires 22 and 23 as will be hereinafter more fully explained.

A sleeve 24 rotatably mounted on the tube 12, is provided with a switch collar 25 at its inner or rear end fixed to or formed integrally therewith and bent from an annular flange on the sleeve to fit over the forward end of the barrel 15, the collar being preferably knurled to provide a grasping surface by which the collar and sleeve may be easily manipulated or turned while grasping the handle, or independently thereof. The tube 12 is provided with oppositely disposed circumferential slots 26 each having an oppositely beveled or inclined camming surface 27 on its rear wall, preferably sloping from the intermediate portion or center of the slot which extends only partly around the tube. As shown the slots 26 are located in diametrically opposite sides of the tube 12 to receive a headed pin 28 which is fixedly mounted in sleeve 24 and extends through similarly related openings therein. The pin 28 passes through the slots 26 and co-operates with the cam surfaces or cams 27 of the tube 12 to actuate the switch upon rotative movement of the switch collar 24.

An incandescent electric bulb 29 enveloped by the reflector casing in the usual fashion, has a single stud or contact 30 and oppositely extending lugs or pins 31 adapted to enter bayonet slots 32, in the forward end of the tube 12. By turning the bulb, the pins may be moved into the curved laterally directed or circumferential portions 33 of the slots in the usual manner.

A stationary plug 35 of suitable dielectric or insulating material, such as bakelite, porcelain, hard rubber or the like is mounted in the tube 12 near the forward end thereof and held from rotation by a lug or projection 36 stamped or pressed in from the tube into a longitudinal groove 37 in the plug so that the plug is free for translation or longitudinal movement, but is splined or held against turning. The plug is provided with a central opening 38 therethrough, to receive a contact 39 preferably of T-shaped form best shown in Figs. 1 and 7 of the drawings. The shank of the contact 39 extends through the opening in the plug and its outer end 40 may be enlarged or upset to retain the contact in position and locate the same for engagement with the contact 30 of the lamp. The cross member or bar 41 is embedded in the opposite end of the plug to form a contact strip or surface and the ends thereof are spaced from the periphery and ends of a diametrical groove 42 in the plug which receives it so that contact with the tube 12 and thus short circuiting is prevented.

The switch plug 43 made of material similar to the plug 35 is cylindrical or of other cross section according to the shape or cross section of the tube or housing therefor. This switch plug is mounted in the tube 12 intermediately of its ends in spaced relation to the plug 35, and is provided with spaced openings 44 and 45 through which the wires 22 and 23 extend. The wire 23 is connected to a terminal strip 46 secured in a peripheral longitudinal groove at the inner end of the plug 43, this strip being electrically connected through the pin 28 to the tube 12.

The wire 22 after extending through the opening 44, is accommodated in a cut-out or recess 47 in one side of the plug 43, where it is connected to the binding post 55. The plug 43 is adapted to be turned in the tube 12 by switch collar 24 acting through the pin 28. The plug 43 is also provided with a longitudinally movable contact member 48 depicted more clearly in Fig. 6 of the drawings and shown in an assembled position in Figs. 1 and 2 of the drawings. This contact member consists of an elongated strip of current conducting material like the contact 39 such as brass or copper and is provided with an opening 49 in the end of its shank portion or stem and has an enlargement 50 at its opposite end bifurcated as indicated at 51 to provide spaced contact portions or furcations 52 at either side thereof. If desired the recess 51 may contain insulation, the important fact being the provision of spaced contact portions adapted in one position to engage the contact 41 and in another position normal thereto, to bridge or straddle the portion 41 so as to remain out of contact therewith thereby making and breaking the circuit. The contact 48 is slidably movable in a chamber 53 in the plug 43, which has an axial slot 54 communicating therewith at its inner end through which the shank of the contact 48 projects for connection to the lead wire 22 by means of the binding post 55 threaded into the opening 49.

The opposite or forward end of the plug 43 is provided with a transverse slot 56 extending diametrically thereof to movably receive the enlargement 50 therein. An expansible coil spring 57 surrounding the shank 48 within the chamber 53 engages a cup washer 58 at the head end 50 and a washer 59 in the opposite end wall of the chamber through which the slot 54 extends. The spring 57 urges the head 50 into engagement with the contact 41 or the plug 35 depending upon the angular position of the head. Movement is limited by abutment of the binding post 55 against the end wall of the chamber 53 between the chamber and the cut-out 47. The spring serves the dual function of insuring a close contact between the head 50 and the contact 41 and of urging the bulb outwardly in its socket so that the pins 31 are forced into and held in their seats in the bayonet slots 32. The bulb is thus firmly held in place and prevented from jarring loose due to vibrations incident to traveling over uneven roads or otherwise, and the parts are also held from rattling or getting loose and disrupting the circuit or causing short circuiting.

In the operation of the device, the switch collar 24 is given a partial turn to rotate the plug 43 so that the contacts 52 are moved into alignment with the contact 41 to close the circuit or are caused to straddle the contact 41 to open the circuit. In this latter position, the contact portions 52 will remain in firm engagement with the spaced portions of the insulated plug 35 upon opposite sides of the slot or groove 42 in which the part 41 fits, so that the bulb is not only held in position, but all the parts are retained in position and the contacts are held out of engagement. Since the spring urges the plug 43 inwardly, the pin 28 will be held in the outer ends of the slots 26 so that the switch will always remain in open or closed position.

Another advantage of the construction is that the plug 35 may move longitudinally when the bulb is forced into its socket to facilitate insertion of the bulb. During the insertion, the spring 57 will be compressed and thereafter its expansion will hold the contacts engaged under tension and the bulb in position.

While I have entitled the invention as a spotlight switch it will be understood that the switch is adapted for general use and may vary widely in its construction without departing from the spirit of my invention.

I claim:

1. In combination, a mounting unit including a tube having slots in one end provided with seats, a lamp having lugs engaged in the slots and seats, a plug mounted in the tube against rotation and adapted to have slight longitudinal movement, a contact carried by said plug in engagement with the stud of the lamp, a second plug adapted to turn in the tube, an operating ring on the tube having connection with the second-named plug for turning the same, means co-operative between the ring and tube to hold the plug in two set positions when partially turned, a contact carried by the second plug and normally spring pressed toward the first-named contact, the second-named contact being bifurcated to engage the first-named contact in one position and straddle the same in another position, and an electrical circuit including said contact and lamp and the tube.

2. In combination, a mounting unit including a tube having slots in one end provided with seats, a lamp having lugs engaged in the slots and seats, a plug mounted in the tube against rotation and adapted to have slight longitudinal movement, a contact carried by said plug in engagement with the stud of the lamp, a second plug adapted to turn in the tube, an operating ring on the tube having connection with the second-named plug for turning the same, means co-operative between the ring and tube to hold the plug in two set positions when partially turned, a contact carried by the second plug and normally spring pressed toward the first-named contact, the spring pressure serving to hold said contacts in open or closed positions and forcing said lugs of the lamp outward into the seats.

3. In combination, a mounting unit, a casing mounted therein, a handle fixedly mounted on said casing, a switch mounted in the casing and including a pair of contact carrying plugs slidably mounted in said casing for movements longitudinally thereof, a single spring pressed contact carried by one of said plugs, a contact element carried by the other plug, means carried by the casing including a member adjacent said handle and movable about the axis of said casing for moving one of said plugs longitudinally of the casing and the contacts into and out of engagement with one another, and a lamp having its base mounted in a socket formed by the casing and exerting pressure against one contact through engagement with the other when having its stud engaging the latter.

4. In a spotlight of the character described, a mounting, a tube held in the mounting, a pair of plugs coaxially and relatively slidably mounted in the tube and having contact members normally engaging one another, a handle on the tube, switch means adjacent said handle engaged with one of said plugs for rotating it for making and breaking electrical connection between said contacts, a lamp mounted in one end of the tube in engagement with the other contact, said tube having bayonet slots, the lamp having lugs on its base engaged with the slots and adapted when seated therein to be held against outward displacement therefrom, and a single spring engaging one of said contacts and acting against the other said contact for holding the lugs in the seats of the slots.

5. In combination, a switch-carrying tube, a handle having a barrel portion adapted to telescope over the rear end of the tube, a clamp screw carried by and extending diametrically of the barrel portion of the handle, the tube having a recess for the reception of said screw when positioning the handle on the tube, and a clamp member on the screw within the tube adapted to be tightened against the internal face of the tube for clamping the handle and tube together.

6. In combination, a tube, a lamp plug and a switch plug in said tube, the latter plug being oscillatory, current-supply wires connected to said switch plug, the tube having an opening from one end through which said wires are adapted to pass and emerge from the bottom of the tube, a handle having a barrel portion adapted to telescope over said end of the tube and having an opening from one end adapted to receive said wires and to register with said opening in the tube, means for securing said handle on the tube, and a switch-operating collar on the tube fitting over the forward end of the barrel and closing the end of the wire opening therein.

GEDOR W. ALDEEN.